US 6,693,274 B2

(12) United States Patent
Baird et al.

(10) Patent No.: US 6,693,274 B2
(45) Date of Patent: Feb. 17, 2004

(54) METHOD AND SYSTEM OF SORTING A PLURALITY OF RECEIVED ARTICLES HAVING VARYING SIZE AND SHAPE

(75) Inventors: Randy Baird, Bolivar, PA (US); Arthur L. Dean, Indiana, PA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/040,216

(22) Filed: Oct. 29, 2001

(65) Prior Publication Data

US 2003/0080286 A1 May 1, 2003

(51) Int. Cl.⁷ .............................. G01B 5/20; B07C 5/04
(52) U.S. Cl. .................. 250/221; 250/223 R; 156/360; 209/586
(58) Field of Search ............................ 250/221, 222.1, 250/223 R; 198/370.04, 370.05; 209/576, 586, 587, 600, 601, 604, 912, 918; 33/556, 559; 156/360, 542

(56) References Cited

U.S. PATENT DOCUMENTS

| 3,575,292 | A | | 4/1971 | Roda |
| 3,977,524 | A | | 8/1976 | Boots |
| 4,132,314 | A | | 1/1979 | von Beckmann et al. |
| 4,586,613 | A | | 5/1986 | Horri |
| 4,592,434 | A | | 6/1986 | Perez Galan |
| 4,971,155 | A | | 11/1990 | Peturis |
| 6,349,755 | B1 | * | 2/2002 | Sardo .......................... 156/360 |
| 2002/0011432 | A1 | * | 1/2002 | Tanimoto ..................... 209/586 |

* cited by examiner

Primary Examiner—Stephone B. Allen

(57) ABSTRACT

The present invention relates to a method and apparatus for dimensionally sorting a group of received articles, like fruits and vegetables, and using the determined different sizes for differentiation during the subsequent processing and handling of the articles. Generally, the size and shape of each article is determined by the degree of deflection of one or more sensor heads located along a path the article is traversing. The determined size and shape is then used to direct the article during the subsequent processing and/or handling of the article.

21 Claims, 6 Drawing Sheets

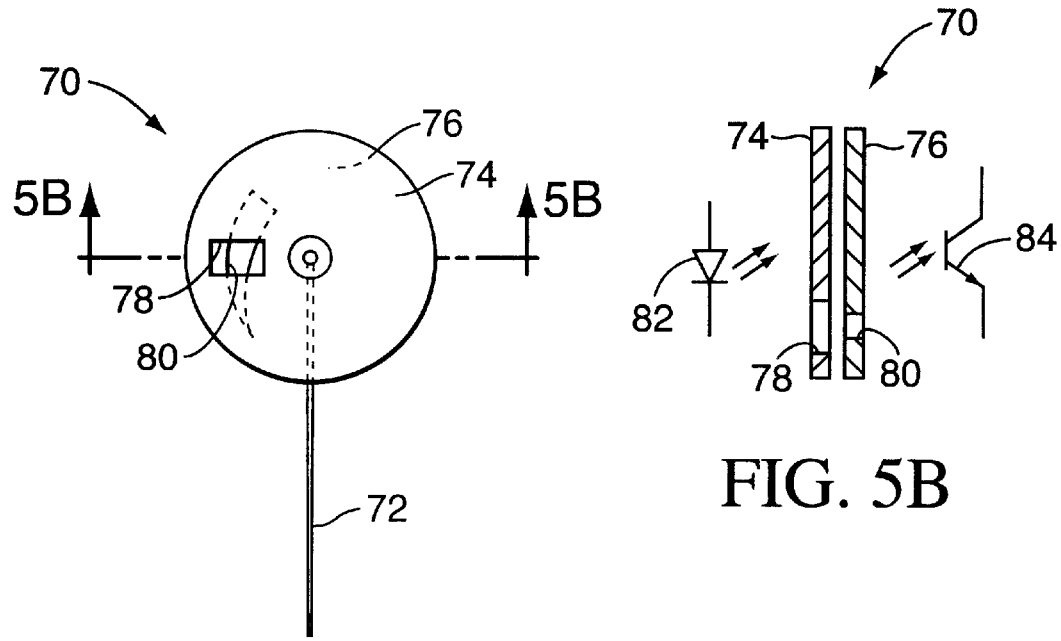
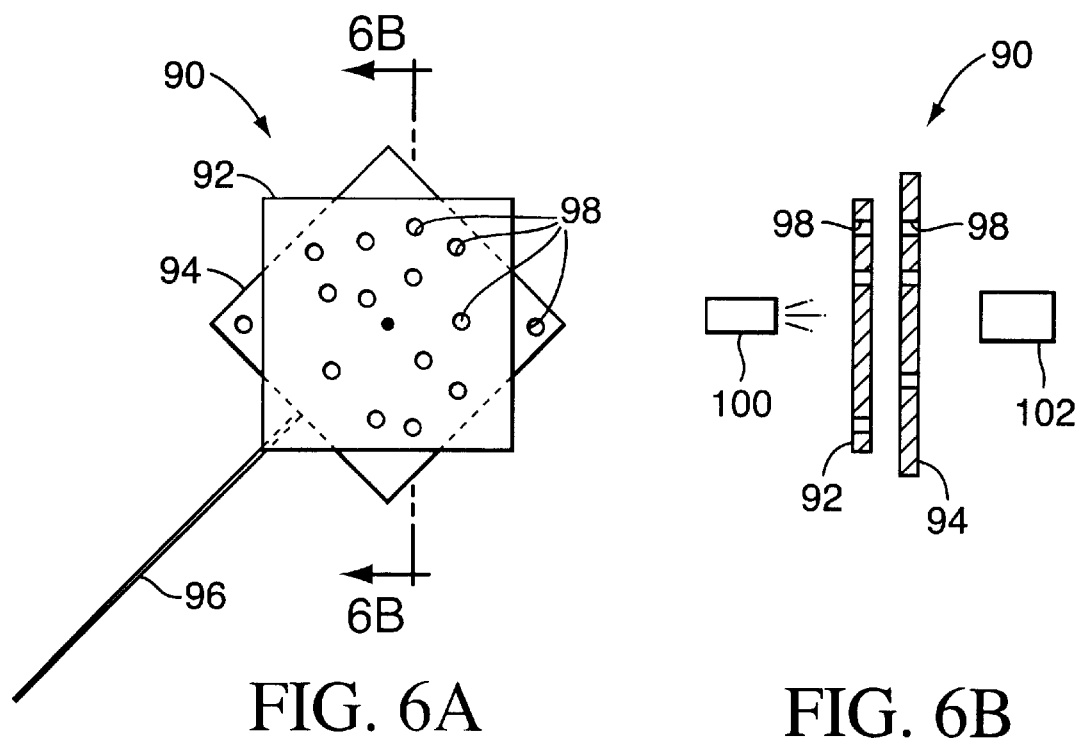

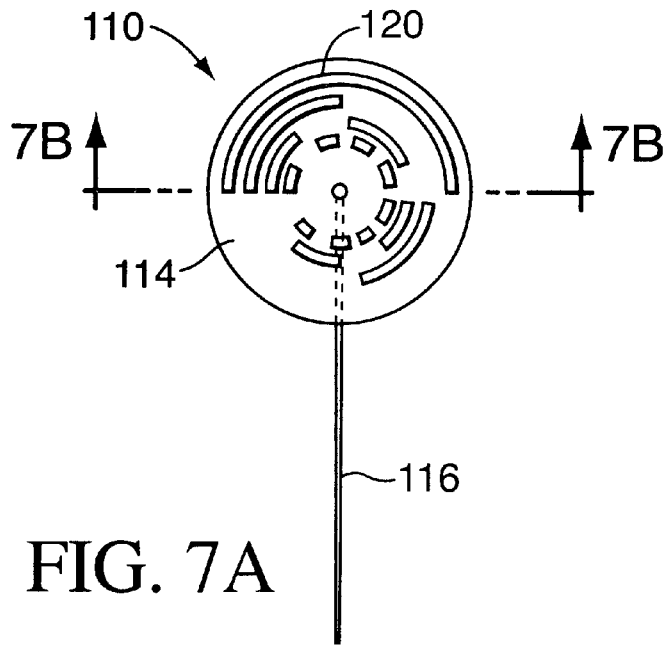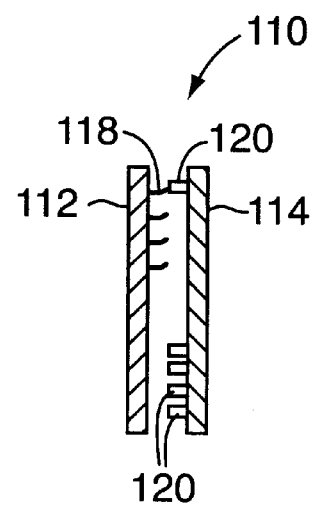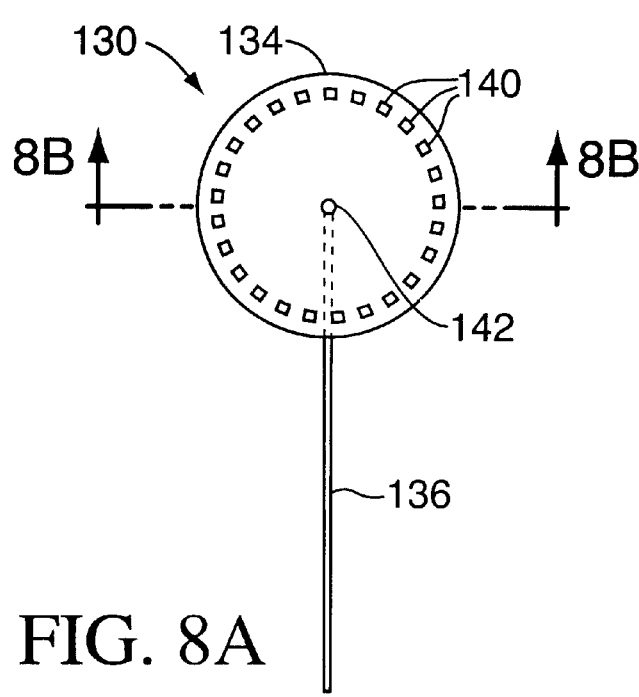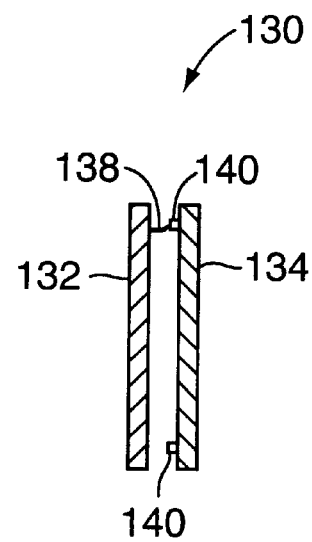
FIG. 7A
FIG. 7B
FIG. 8A
FIG. 8B

METHOD AND SYSTEM OF SORTING A PLURALITY OF RECEIVED ARTICLES HAVING VARYING SIZE AND SHAPE

FIELD OF THE INVENTION

The present invention relates to a method and apparatus for dimensionally sorting a group of received articles, and using the determined different sizes for differentiation during the subsequent processing and handling of the articles. More particularly, the present invention relates to a method and system of sorting articles, where the nature of the articles is such that the articles, by their nature, have inherent size and shape differences, like fruits and vegetables.

BACKGROUND OF THE INVENTION

There are several types of items/articles, which traditionally come in varying non-standard shapes and sizes. Included among these types of articles are most types of fruits and vegetables, as well as other types of articles which are generally grown and/or are produced by nature. However articles which come in varying non-standard shapes and sizes are not limited to only those items which are produced by nature, but also can occur in items which are largely man-made. For example hand-made articles, especially articles made using less sophisticated manufacturing techniques, can also exhibit the same differences or non-uniformities in both shape and size.

Individual items within groups of articles, which have varying shapes and sizes, can sometimes require special packaging and/or handling as a result of their specific size and shape. For example, specific machine tooling or processing technique may be limited to or better suited for use with items having a size or shape, which falls into a particular range.

While in some instances the reasons for sorting the articles may be for purposes of managing the physical demands associated with the subsequent handling of the article, in other instances the reasons for sorting the articles may be strictly for purposes of satisfying customer preferences. For example, in some instances, it may be desirable to group items having like size and shape together, so as to provide the customer with multiple items which are more uniform in nature, especially where product uniformity is either desirable or important. In a somewhat related instance a customer may be willing to pay a premium for articles which exceed or fall within a particular size and shape criteria, thereby creating an economic advantage for segregating and/or sorting the articles within a group.

Apples are a good example of one type of article, which by its nature inherently has varying shapes and sizes, for which it may be beneficial to sort based upon their size and shape. Where an apple is being sold for direct consumption by the consumer, the consumers preference may be for apples which are larger in size. When the same type of apple is sold for use by a food processing company the size and shape of the article may be relatively less important. This may especially be the case for a food processing company, where the subsequent processed form is generally independent of the articles' original size and shape. One such example may be a food processing company which produces apple sauce.

However bigger may not always be better. For example, there may be a market for smaller bite size tomatoes for use in salads, which could similarly be sorted to insure size conformance that is consistent with consumer demand.

Several prior systems have been used to dimensionally sort articles into groups, which vary as to size and shape. One such example includes systems which use holes in screened beds, which allow certain smaller sized articles to pass through, while blocking certain larger sized articles. However the holes in the screened beds are limited in accuracy and are not easily adjustable, when size requirements change. These systems further experience limitations in the amount of product which may be processed in a given square area, and in a given amount of time.

Further prior systems have used sensors, which determine the product density and water content as the product passes underneath the sensors. However these systems generally do not determine the size or shape of the product.

Still further, machine vision systems for determining relative dimensioning have been previously used. But the computational processing and analysis time required by the machine vision systems have generally placed significant limitations on the production volumes which are achievable for these types of systems. This is especially true when systems make use of machine vision data which distinguish between several different grey-scale levels.

Consequently, it would be desirable to provide a method and a system for dimensionally differentiating between a plurality of articles of varying sizes and shapes, which can be performed with enhanced accuracy and in a relatively small amount of time. It would be further beneficial to provide a method and system, where the same system can be readily adjusted so as to detect between different varying sizes and shapes, and/or adjusted to accommodate different types of articles.

These and other objects, features, and advantages of this invention are evident from the following description of a preferred embodiment of this invention, with reference to the accompanying drawings.

SUMMARY OF THE INVENTION

The present invention provides a method for dimensionally sorting a plurality of articles received as a group, each article having varying size and shape. The method comprises the articles being conveyed along a path. The articles are then singulated into one or more single file rows, as the articles traverse the path. The dimensional characteristics of the articles are then detected by detecting the deflection of one or more sensor heads which passively interfere with the progress of each of the articles, as the articles are conveyed. The articles are then differentiated between a plurality of respective size/shape groupings, based upon the detected dimensional characteristics.

In at least one further embodiment, differentiation of the articles between a plurality of respective size/shape groupings includes storing data associated with the detected dimensional characteristics for each of the articles. In some instances the data stored represents decision data for use in the subsequent processing of the article. In other instances the data stored represents data descriptive of the determined physical dimensional characteristics.

The present invention further provides a system for dimensionally sorting a plurality of received articles, each article having a varying size and shape. The system includes a conveyor having one or more paths along which the articles are formed and transported in single file rows. One or more sensor heads are positioned at one or more points along the one or more paths of the conveyor. Each sensor head includes a contact shaft which passively engages the articles and deflects an amount corresponding to the size/ shape of the article passing in proximity thereto. A processing unit receives the sensor head readings and makes a determination of the size/shape of the articles and produces output data for later differentiation of the articles.

In at least one embodiment, the system further includes a memory for storing data corresponding to the determined size/shape characteristics of each of the articles. In some instances the data is representative of the physical characteristics. In other instances the data is representative of decision data to be used to determine or control the subsequent processing of the article.

In a further embodiment, the system includes a sorter for diverting the articles into one of a plurality of size/shape groupings based upon the determined size/shape characteristics of the article.

Other features and advantages of the present invention will be apparent from the following detailed description, the accompanying drawings, and the appended claims.

BRIEF DESCRIPTION OF THE DRAWINGS

FIG. 5A is a front plan view of a sensor head arrangement using a photo-electric detection arrangement;

FIG. 5B is a partial schematic arrangement and cross sectional side plan view of the sensor head, shown in FIG. 5A;

FIG. 6A is a front plan view of a sensor head arrangement using a machine vision detection arrangement;

FIG. 6B is a partial cross sectional side plan view of the sensor head, shown in FIG. 6A;

FIG. 7A is a front cross sectional plan view of a sensor head arrangement using an absolute position encoder arrangement;

FIG. 7B is a partial side plan view of the sensor head, shown in FIG. 7A;

FIG. 8A is a front cross sectional plan view of a sensor head arrangement using a pulse encoder arrangement;

FIG. 8B is a partial side plan view of the sensor head, shown in FIG. 8A;

DETAILED DESCRIPTION OF THE PREFERRED EMBODIMENTS

Figure 1:
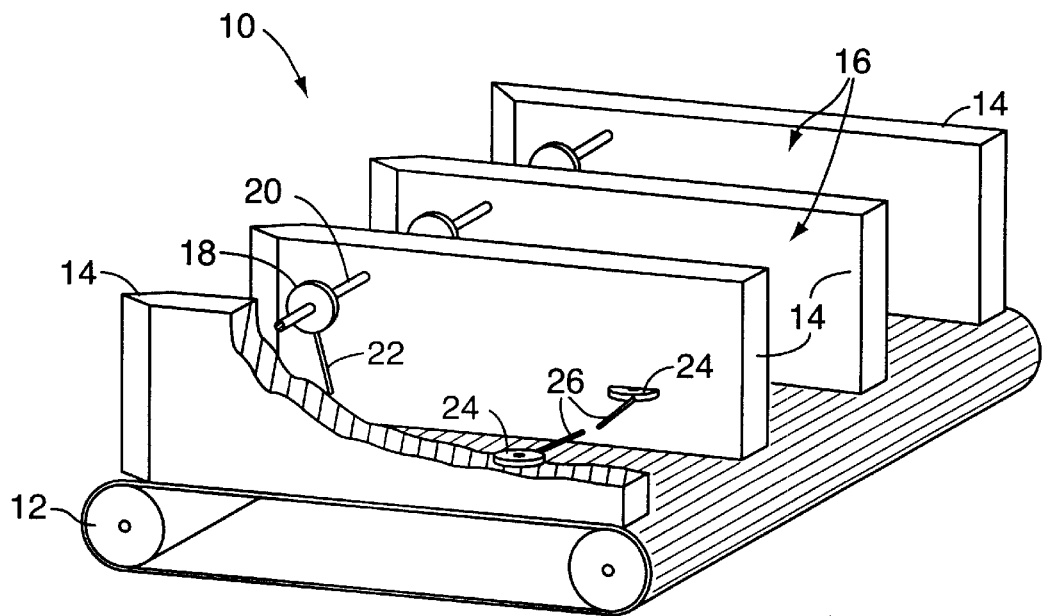
FIG. 1 is an isometric view of a dimensional sorter system, in accordance with the present invention, partially cut-away to better illustrate the sensor heads.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an isometric view of a dimensional sorter system 10, in accordance with the present invention. The dimensional sorter system either includes or rests upon a conveyor 12 which transports articles to be sorted through the dimensional sorter system. Generally, the dimensional sorter system 10 includes a plurality of path dividers or lane divider sidewalls 14 oriented substantially parallel to one another, thereby forming one or more singulating lanes or paths 16 therebetween, through which articles to be sorted can travel.

In FIG. 1, one of the lane divider sidewalls 14 has been partially cut away to more clearly illustrate several sensor heads, which are positioned at multiple points along each of the paths 16. In the illustrated embodiment, one sensor head 18 or vertical axis sensor is supported by a cross mount 20 near the top and between two of the sidewalls 14. The sensor head 18 is arranged such that an associated probe arm or contact shaft 22 extends downward at a slight angle.

The contact shaft 22 extends into the path 16, through which articles to be sorted will travel, and passively engages any articles that pass therethrough. As articles pass beneath the sensor head 18, and come into contact with the contact shaft 22, the contact shaft 22 will deflect an amount corresponding to the size and shape of the article passing proximate thereto. In the case of the sensor head 18, the amount of deflection corresponds to the height of the article. Generally, each path 16 has a corresponding sensor head 18 supported by a cross mount 20.

The illustrated embodiment further includes a pair of oppositely facing sensor heads 24 or horizontal axis sensors, which extend inward towards the corresponding path 16 from respective sidewalls 14. Similar to the contact shaft 22 of the vertical axis sensor, the horizontal axis sensors 24 have contact shafts 26, which extend into the path 16 for passively engaging any articles passing therethrough. However, instead of deflecting upward, the contact shafts 26 of the horizontal axis sensors 24 together deflect outward an amount corresponding to the width of the article passing therebetween.

Figure 2A:
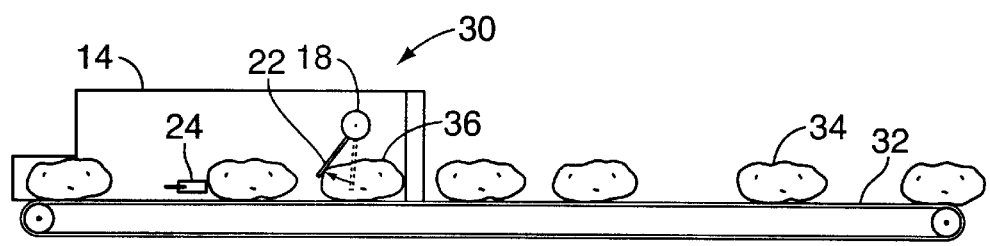
FIGS. 2A and 2B are both a side plan view and a top plan view of one embodiment of the dimensional sorter, shown in FIG. 1, as an add-on to an existing conveyor.
Figure 2B:
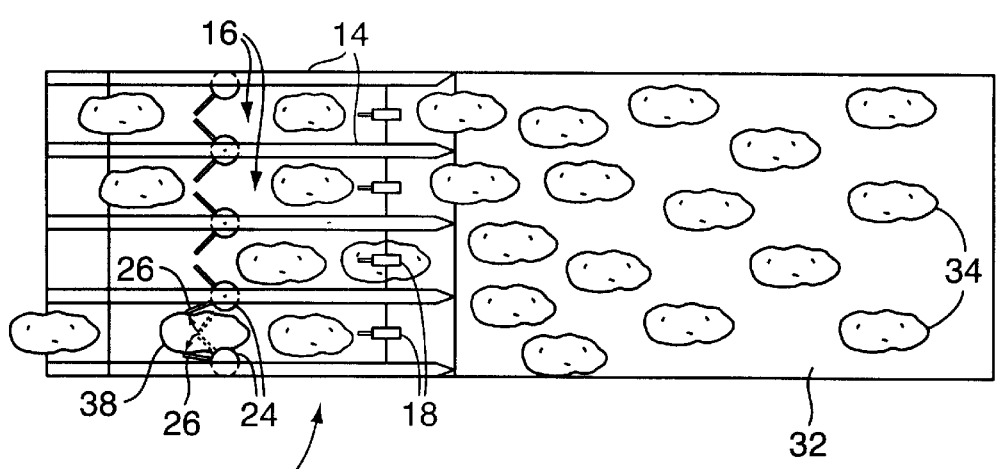

FIGS. 2A and 2B illustrate both a side plan view (FIG. 2A) and a top plan view (FIG. 2B) of one embodiment of the dimensional sorter 30, consistent with the dimensional sorter system 10, shown in FIG. 1. Specifically the dimensional sorter 30 illustrated in FIGS. 2A and 2B could be used as an add-on to an existing conveyor 32. Similar to the dimensional sorter 10, discussed in connection with FIG. 1, the dimensional sorter illustrated in FIGS. 2A and 2B also includes a plurality of lane divider sidewalls 14, which define one or more article paths 16, and a plurality of sensor heads 18 and 24 positioned at multiple points along the length of the article paths 16.

Additionally shown in FIGS. 2A and 2B are examples of a plurality of articles 34 being conveyed along the conveyor 32 and through the one or more paths 16. In the specific example illustrated in FIGS. 2A and 2B, the shapes of the articles 34 correspond to the shapes of potatoes, one such type of article which is well suited for use with the present invention. In FIG. 2A, one of the articles, article 36, is shown engaged with one of the contact shafts 22 of sensor head 18. In FIG. 2B, an article 38 is shown engaged with the contact shafts 26 of a pair of sensor heads 24. Contact shafts 22 and 26 are shown in both a deflected position and an undeflected position.

By monitoring the degree of deflection of the contact shafts 22 and 26 of both sets of sensor heads 18 and 24, the dimensional sorter can determine both the varying height and width of the articles 34 being sorted. Generally as the article 34 passes the sensor heads 18 and 24, a corresponding surface outline can be determined or a maximum magnitude can be determined in that dimension. It is further possible to determine length if the speed at which the articles 34 pass between or beneath the sensor heads 18 and 24 is known.

Figure 3A:
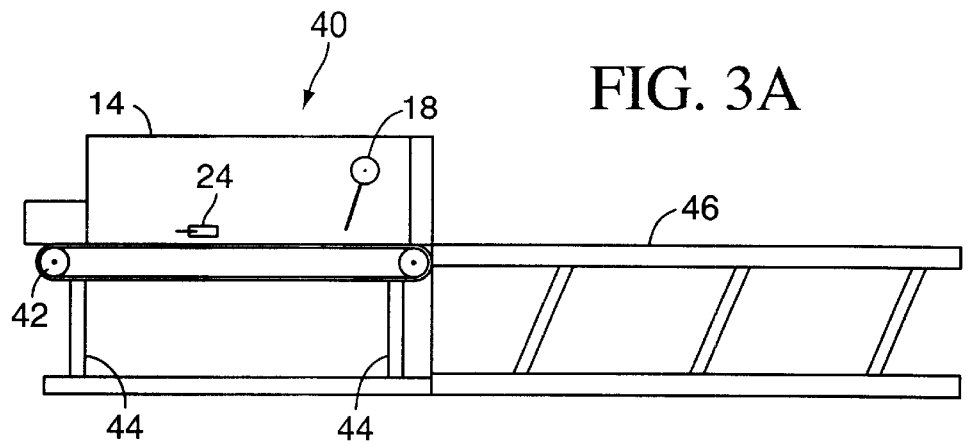
FIGS. 3A and 3B are both a side plan view and a top plan view of one embodiment of the dimensional sorter, shown in FIG. 1, as a stand-alone unit.
Figure 3B:
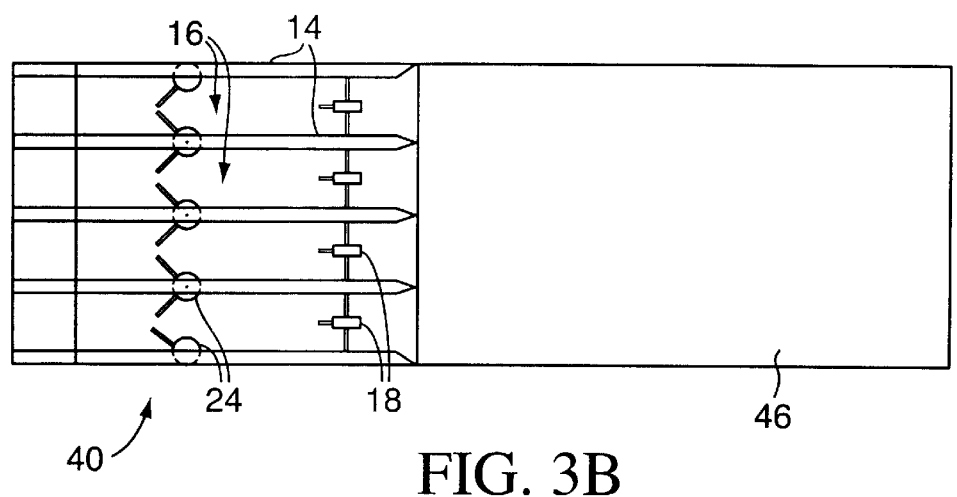

FIGS. 3A and 3B illustrate both a side plan view (FIG. 3A) and a top plan view (FIG. 3B) of a further embodiment of the dimensional sorter 40, consistent with the dimensional sorter system 10, shown in FIG. 1. The dimensional sorter 40, shown in FIGS. 3A and 3B is a stand-alone unit which can be interspersed between other elements in the processing path of the articles. While the top plan view, shown in FIG. 3B, is generally similar to the top plan view, shown in FIG. 2B, differences can be seen between the two side plan views, FIGS. 2A and 3A. The stand-alone dimensional sorter 40 includes its own conveyor 42, and likewise its own supports 44.

The system illustrated in FIG. 3A shows at least one further difference. Specifically, articles are conveyed to the dimensional sorter 40 via a vibratory feeder 46, as opposed to a conveyor 32. However one skilled in the art will readily recognize that any suitable method of conveying articles 34 could be used, including the use of a conveyor.

Otherwise the dimensional sorter 40 operates similar to the dimensional sorter 30, shown in FIGS. 2A and 2B, including the operation of the sensor heads 18 and 24 in determining the dimensional characteristics of the articles 34, not shown.

Figure 4:
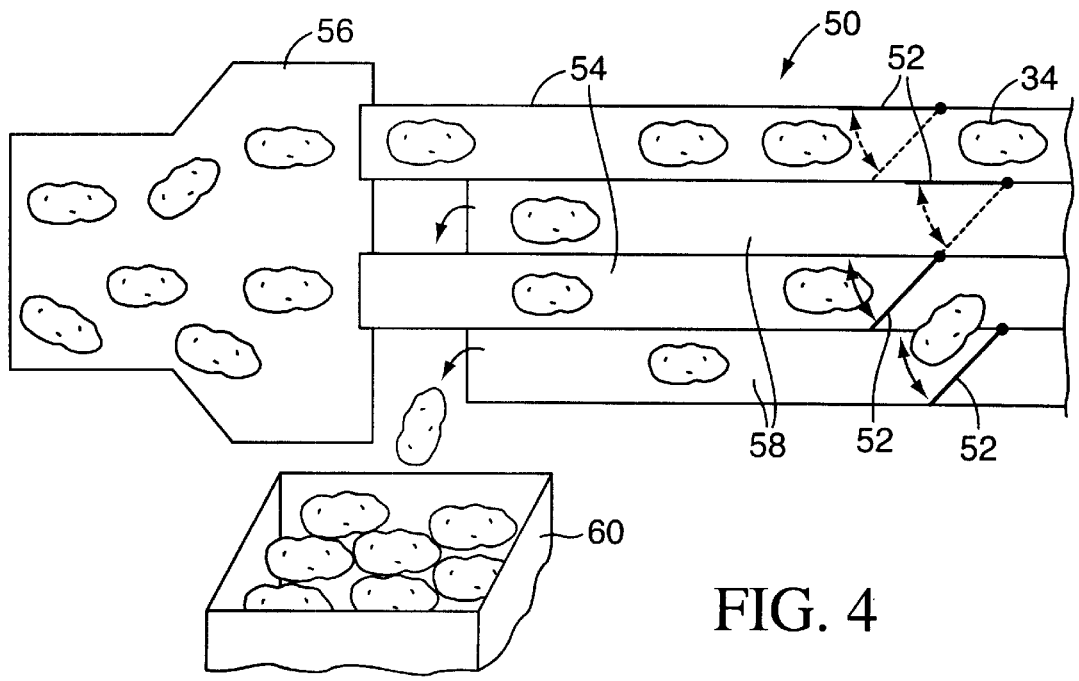
FIG. 4 is a top plan view of a dimension sorter for diverting the articles into one of a plurality of size/shape groupings based upon the determination of the size/shape characteristics of the article.

After the dimensional characteristics of the articles 34 are determined, subsequent processing stations can serve to sort or segregate the articles 34, based upon the determined characteristics and the desired sort criteria. One example of a suitable dimension sorter 50 is illustrated in FIG. 4. Specifically, the dimension sorter diverts the articles 34 between one of a plurality of size/shape groupings, based upon the determination of the size/shape characteristics of the article 34.

In the specific example, deflection gates 52 can be selectively positioned to either allow the article 34 to continue along the path unobstructed, or can be positioned to divert the article 34 to an alternative path. The alternative path can then direct the article 34 to an alternative destination, or could further divert the article 34 to a further alternative path. In the illustrated embodiment, one of the paths 54 is represented by a conveyor which extends all the way to a subsequent article mover 56. The other path or alternative path 58 is represented by a conveyor which stops short of the article mover 56, thereby causing the article 34 to miss the article mover 56 and fall into a collection bin 60.

In the present example, the articles 34 collected in the bin 60 might be of a desired size to be sold as is, while the articles 34 which continue on via the article mover 56 might be routed for further processing, like cutting into french fries.

The specific sensor heads, which passively interfere with the articles and detect the varying degrees of deflection of the associated contact shaft can take many different forms. Several examples of suitable sensor heads are described in the present application, and include photo-electric type sensors, potentiometer type sensors, encoder type sensors, electric type sensors, and machine vision state type sensors. One skilled in the art may recognize that other types of sensors would similarly be suitable without departing from the teachings of the present invention.

Of the included examples, the first of these, a photoelectric type sensor 70, is illustrated in FIGS. 5A and 5B. Generally the sensor 70 includes a contact shaft 72 and two plate-like elements 74 and 76 which rotate with respect to one another. A first plate 74 remains relatively stationary, and the second plate 76 is coupled to the contact shaft 72, and rotates as the contact shaft 72 is deflected.

The first plate 74 includes a window like opening 78, which in the illustrated embodiment is rectangular in shape. The second plate 76 similarly includes an opening 80, but instead of being rectangularly shaped, the opening 80 tapers along its length, and extends for a significant length beyond the limits of the window like opening 78 of the first plate 74. Dependent upon the relative rotational orientation of the two plates 74 and 76, a different portion of the tapered opening 80 will coincide with the window opening 78. Thereby altering the size of the openings 78 and 80 which coincide with one another and creates a common opening which extends through both plates 74 and 76. The size of the openings 78 and 80 which coincide with one another similarly affects the amount of light which can traverse through both of the openings 78 and 80.

A light source or light emitting diode 82 is located on one side of the pair of plates 74 and 76 at a position which coincides with the window-like opening 78 in the first plate 74, and a photo-detector transistor 84 is located on the opposite side of the pair of plates 74 and 76 at a position which similarly coincides with the window-like opening 78 in the first plate. The amount of light from the light emitting diode 82, which traverses both openings, is detected by the photo-detector transistor 84, which produces a correspondingly variable level signal that can be monitored to indicate the degree of deflection.

FIGS. 6A and 6B illustrate a machine vision state type sensor 90. The machine vision state type sensor 90 similar to the photo electric type sensor 70 includes a pair of plate-like elements 92 and 94, which rotate with respect to one another. Plate-like element 92 is relatively rotationally stationary, and plate-like element 94 is relatively rotationally non-stationary. Coupled to the non-stationary one 94 of the two plate-like structures is a contact shaft 96. Each of the plate-like elements 92 and 94 have a plurality of holes 98, which selectively align with corresponding holes 98 in the other plate-like element, depending upon the rotational orientation of the two plate-like elements 92 and 94.

Similar to the photo-electric type sensor, when corresponding holes 98 in each of the plate-like elements 92 and 94 are aligned, light from a light source 100 on one side of the pair of plate-like elements 92 and 94 can be detected by a light detector or sensor array 102 located on the opposite side of the pair of plate-like elements 92 and 94. Examples of suitable sensor arrays include CCD's (charge coupled devices), CID's (charge injection devices), and photo diodes or photo diode arrays.

Using a machine vision state sensor 90 of the type described in connection with FIGS. 6A and 6B, the corresponding holes 98 in the plate-like elements 92 and 94, may be configured to align when the plate-like elements 92 and 94 are at a specific rotational orientation with respect to one another. Alternatively specific ones of the corresponding holes 98 may be configured to alternatively align dependant upon the degree of rotation. In this instance the sensor array 102 would be configured to discern which of the holes 98 are aligned in order to determine the degree of rotation.

An example of a first encoder type sensor head 110 is illustrated in FIGS. 7A and 7B. Similar to the other previously described types of sensor heads, the encoder type sensor head 110 also includes two plate-like elements 112 and 114, which rotate with respect to one another. The first one of the plate-like elements 112 is relatively stationary, and the second one of the plate-like elements 114 rotates relative to the first one of the plate-like elements 112. A contact shaft 116 is coupled to plate-like element 114.

In the illustrated example, the first plate-like element 112 includes four contacts 118, which extend towards and are aligned with a series of corresponding discontinuous tracks 120 located on the second plate-like element 114. The presence and absence of the particular track segments 120 adjacent to the respective contacts 118 at a particular rotational orientation, can be used to uniquely identify the relative rotational orientation of the two plate-like elements 112 and 114, with respect to one another.

In order to facilitate detection of when a particular contact is adjacent a particular track segment 120, the track segments 120 could be formed of a conductive material and coupled to an electrical potential corresponding to a particular logic level. The logic level or electrical potential of the contact 118, which could be biased through a resistor to an alternative logic level, could then be used to determine whether the contact 118 is adjacent to an existing track segment 120.

Any number of tracks 120 and corresponding contacts 118 could be used. By using four tracks and four contacts, up to sixteen different zones could be defined. The use of more tracks and contacts would enable the sensor head to distinguish between an even greater number of zones. Additionally, while the illustrated example shows different zones defined which extend rotationally a full 360 degrees, the different zones could be restricted to an area less than 360 degrees, thereby allowing distinction between a finer degree of rotation using a fewer number of conductive tracks 120 and corresponding contacts 118.

An alternative second encoder type sensor head 130 is illustrated in FIGS. 8A and 8B. The alternative encoder type sensor head 130 similarly has two plate-like elements 132 and 134, which rotationally move with respect to one another, a first plate like element 132, which is relatively rotationally stationary, and a second plate-like element 134 having a contact shaft 136 coupled thereto, and which rotates with respect to the first plate-like element 132.

Similar to the other encoder type sensor head 110, illustrated in FIGS. 7A and 7B, the first plate-like element 132 has a contact 138. The second plate-like element 134 has a corresponding single row of discontinuous track segments 140, which extends in a circle around the rotational center 142 of the two plate-like elements 132 and 134. As the contact 138 travels across each one of the discontinuous track segments 140, a pulse output is generated.

However instead of statically determining the rotational orientation of the two plate-like elements by determining, which ones of the plurality of contacts 118 are presently adjacent corresponding track segments 120, as in the encoder type sensor head 110, illustrated in FIGS. 7A and 7B, the alternative encoder type sensor head 130, illustrated in FIGS. 8A and 8B, tracks the present rotational orientation or degree of deflection by counting the number of pulses received. By monitoring the number of pulses and the relative direction of rotation, a present indication of the rotational orientation of the two plate-like elements can be maintained.

Figure 9:
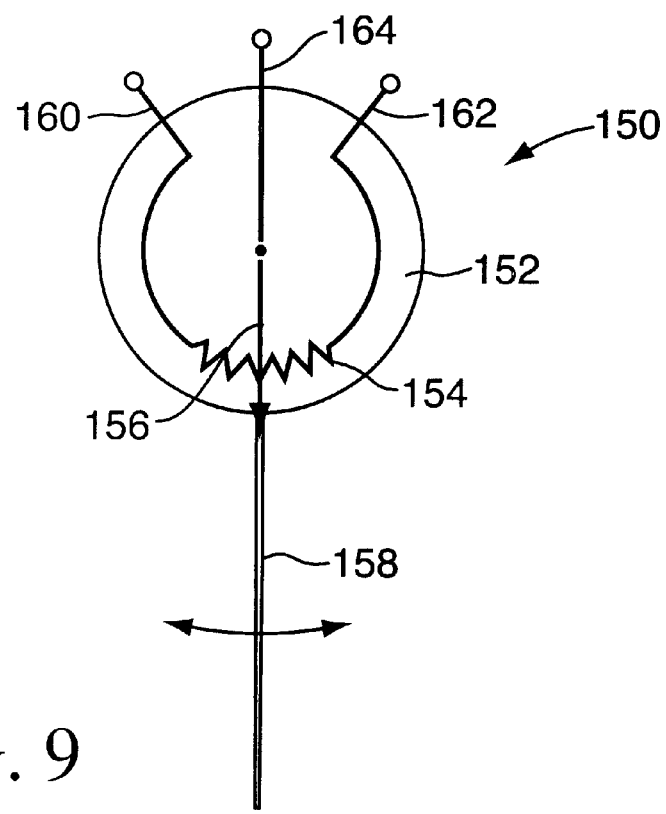
FIG. 9 is a schematic diagram and front plan view of a sensor head arrangement using a potentiometer.

A further sensor type is illustrated in FIG. 9, and includes a potentiometer type sensor 150. However instead of incorporating two plate like elements, the potentiometer type sensor 150 has a sensor body 152, which includes a resistor 154 having a length which extends circumferentially within the sensor body, around at least a portion of the sensor body, and an armature 156 coupled to a contact shaft 158, which as the contact shaft 158 is deflected causes the armature 156 to contact the resistor 154 at differing points along the resistor's length.

One end of the resistor 154 is coupled to a first terminal 160 maintained at a first source electrical potential. The other end of the resistor 154 is coupled to a second terminal 162 maintained at a second source electrical potential. A third terminal 164 coupled to the armature 156 has an electrical potential which is dependent upon the point along the length of the resistor 154, at which the armature 156 is in contact with the resistor 154. In many instances the electrical potential at the third terminal is linearly proportional to the relative distances between the point of contact of the armature 156 and the two ends of the resistor 154.

Figure 10:
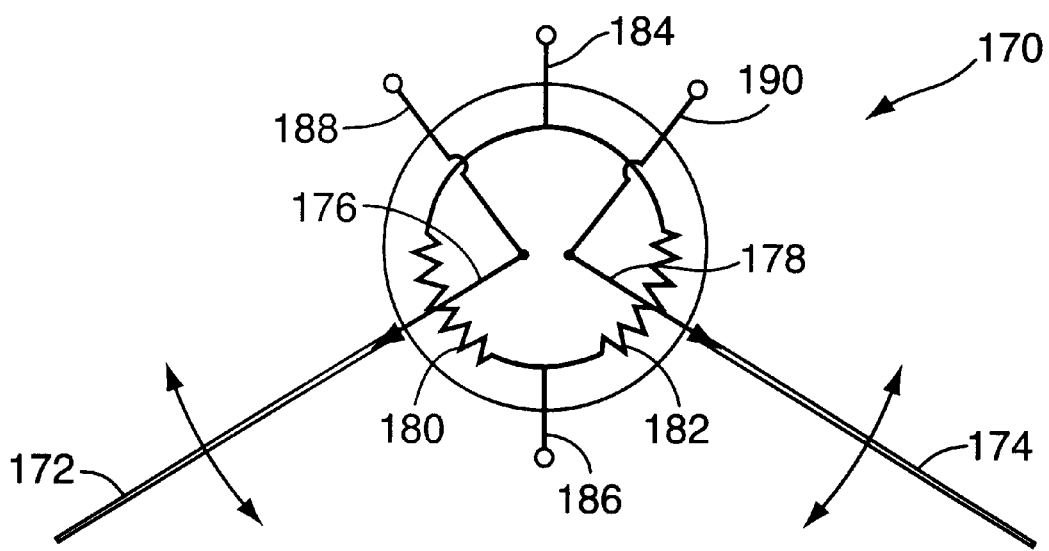
FIG. 10 is a schematic diagram and front plan view of a dual sensor head arrangement using a pair of potentiometers.

FIG. 10 illustrates an alternative embodiment of a potentiometer type sensor 170, which incorporates two contact shafts 172 and 174, each of which is associated with a different armature 176 and 178, and a corresponding resistor 180 and 182. While the respective ends of resistors 180 and 182 can be commonly coupled to corresponding source electrical potentials 184 and 186, each armature is coupled to its own output terminal 188 and 190 for providing an output potential depending upon the contact shafts' relative degree of deflection.

The illustrated potentiometer type sensor 170 incorporating two separate sensor outputs and corresponding contact shafts 172 and 174, is particularly useful for use in connection with sensor heads 24, illustrated in FIGS. 1–3, where the sensor is located in a divider sidewall 14 separating two adjacent article paths 16.

One skilled in the art will readily recognize that other types of sensors would similarly be suitable without departing from the teachings of the present invention including other sensors of similar types but varying construction, and other sensors of different types.

Figure 11:
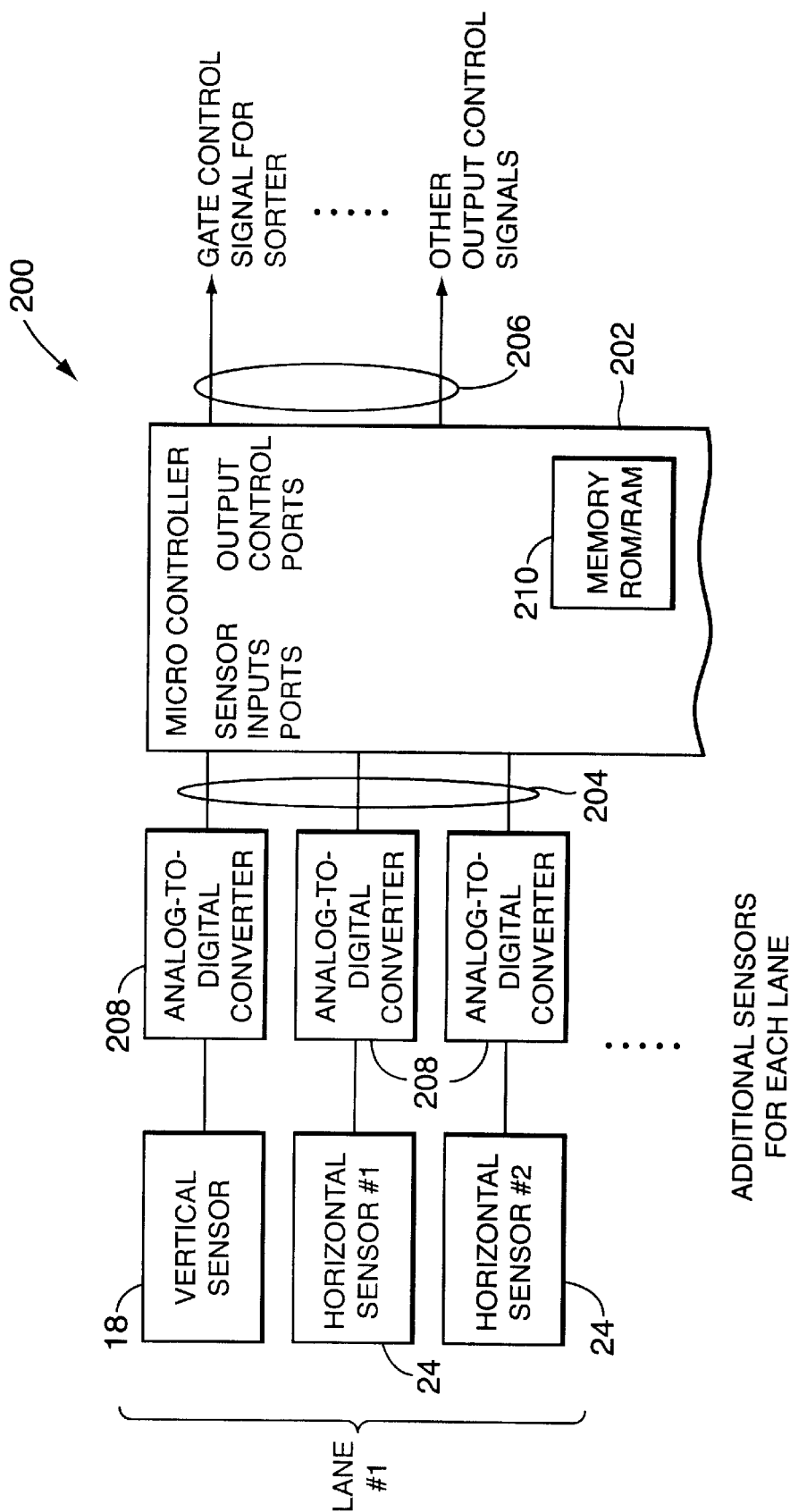
FIG. 11 is a block diagram of a processing unit for use in the dimensional sorter system, illustrated in FIG. 1.

The dimensional sorter system 10, illustrated in FIG. 1, in at least one embodiment, further includes a processing unit 200, which receives the detected sensor values, makes the corresponding determinations as to the size and shape of the articles 34, and produces output data for use in the later differentiation of the articles 34. A partial schematic of an example of one such processing unit 200 is illustrated in FIG. 11.

The processing unit 200 includes a micro-controller 202, which has one or more sensor input ports 204 and one or more output control ports 206. The sensor input ports 204 are coupled to the various vertical and horizontal sensor heads 18 and 24, for receiving signals indicative of the degree of deflection as articles pass adjacent to the sensors 18 and 24.

Where the sensor heads output an analog signal, analog-to-digital converters 208 can be coupled between the sensor heads 18 and 24 and the micro-controller 202, and used to convert the analog output signal into a digital form. In some instances the analog-to-digital converters 208 can be integrated as part of the micro-controller 202.

The micro-controller 202 can then process the signals received from the sensor heads 18 and 24 and make determinations as to the size and shape of the articles 34. The results of the processing can then be stored in a memory 210, and/or used to directly control the subsequent processing of the article 34. Storing the results can sometimes be beneficial where there is a delay between when the determination is made and when control signals for the subsequent processing needs to be received. In most systems, there is an inherent amount of time or delay required for the article 34 to be conveyed between the sensor heads 18 and 24 of the dimensional sorter system 10 and the subsequent processing stations where product differentiation data is used.

In some systems the dimensional data is stored as data indicative of the physical characteristics of size and shape of the article. In other systems the dimensional data is stored as decision data indicative of how the subsequent processing stations should alternatively handle the article 34, during subsequent processing. In either instance, at the appropriate time, the micro-controller produces an output signal, which is provided via the one or more output control ports 206 to the subsequent processing stations for properly differentiating between the handling of the articles 34.

Similar to the analog-to-digital converters 208, the memory 210 could be integrated as part of the micro-controller 202 or could be maintained separate therefrom.

The micro-controller 202 receives a number of sensor input control signals 204, which generally corresponds to the number of article paths 16 and the number of sensor heads 18 and 24 per article path 16. The micro-controller further produces a number of output control signals 206, which is generally dependant upon the number of subsequent processing stations and the number of signals required for each of the processing stations.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

What is claimed is:

1. A method of dimensionally sorting a plurality of articles received as a group, each article having varying size and shape, the method comprising:

conveying the articles along a path;

singulating the articles into one or more single file rows as the articles traverse the path;

detecting the dimensional characteristics of the articles by detecting the deflection of sensor heads which passively interfere with the progress of each of the articles, as the articles are conveyed, said sensor heads including at least one deflectable sensor operatively associated with a respective one of each of said rows for measuring the height of each article conveyed in that respective row, and at least one deflectable sensor operatively associated with a respective one of each of said rows for measuring the width of each article conveyed in that respective row; and differentiating the articles between a plurality of respective size/shape groupings based upon the detected dimensional characteristics.

2. A method in accordance with claim 1, wherein detecting the dimensional characteristics of the article includes detecting the speed at which the article is traveling as the article passes by the sensor heads, and analyzing the degree of deflection of at least one of the sensor heads with respect to the speed at which the article is traveling to determine the size/shape of the article.

3. A method in accordance with claim 2, wherein analyzing the degree of deflection of at least one of said sensor heads includes measuring the voltage drop across a potentiometer type sensor head whose impedance changes based upon the degree of deflection.

4. A method in accordance with claim 2, wherein analyzing the degree of deflection of at least one of said sensor heads includes counting a number of pulses in an output signal produced by an encoder type sensor head, where the number of pulses corresponds to the degree of deflection.

5. A method in accordance with claim 2, wherein analyzing the degree of deflection of at least one of said sensor heads includes sensing the magnitude of light emitted through the portion of a variable width opening, which is aligned with a sense window, where the magnitude of light emitted corresponds to the degree of deflection.

6. A method in accordance with claim 2, wherein analyzing the degree of deflection of at least one of said sensor heads includes detecting the alignment of a hole pattern of a template plate with a hole pattern of a rotation plate which coincides with one another when the degree of deflection of a corresponding sensor head is equal to the predetermined value.

7. A method in accordance with claim 1, wherein detecting the dimensional characteristics of the article includes the deflection of at least a portion of a vertical axis sensor head, which deflects upward as the article passes beneath.

8. A method in accordance with claim 1, wherein detecting the dimensional characteristics of the article includes the deflection of at least a portion of one or more of a pair of opposing horizontal axis sensor heads, which deflect outward in opposition directions as the article passes between the pair of sensor heads.

9. A method in accordance with claim 1, wherein differentiating the articles between a plurality of respective size/shape groupings includes diverting between the one or more single file rows of articles, articles having size/shape characteristics which more closely correspond to the general size/shape characteristics of the articles in a particular single file row.

10. A method in accordance with claim 1, wherein differentiating the articles between a plurality of respective size/shape groupings includes storing data associated with the detected dimensional characteristics for each of the articles.

11. A method in accordance with claim 10, wherein storing data associated with the detected dimensional characteristics includes storing decision data independent from any dimensional data, for use in at least one of the later processing and packaging of the article.

12. A method in accordance with claim 1, wherein the articles to be sorted are types of fruits or vegetables.

13. A system for dimensionally sorting a plurality of received articles, each article having a varying size and shape comprising:

a conveyor having one or more paths along which the articles are formed and transported in single file rows;

a plurality of sensor heads positioned at one or more points along the one or more paths, each sensor head including a contact shaft which passively engages the articles and deflects an amount corresponding to the size/shape of the article passing in proximity thereto, said sensor heads including at least one deflectable sensor operatively associated with a respective one of each of said rows for measuring the height of each article conveyed in that respective row and at least one deflectable sensor operatively associated with a respective one of each of said rows for measuring the width of each article conveyed in that respective row; and a processing unit for receiving the sensor head readings and making a determination of the size/shape of the artivles and for producing output data for later differentiation of the articles.

14. A system in accordance with claim 13, wherein the sensors include a vertical axis sensor, whose contact shaft deflects upward as one of the received articles passes therebeneath.

15. A system in accordance with claim 13, wherein the sensors include a pair of oppositely facing horizontal axis sensors, whose contact shafts deflects outward as one of the received articles passes therebetween.

16. A system in accordance with claim 13, wherein the processing unit includes a memory for storing data corresponding to the determined size/shape characteristics of each of the articles.

17. A system in accordance with claim 16, wherein the data corresponding to the determined size/shape characteristics of each of the articles includes decision data independent of the dimensional data of the articles, for use in the subsequent processing of the article.

18. A system in accordance with claim 13, further comprising a dimension sorter for diverting the articles into one of a plurality of size/shape groupings based upon the determination of the size/shape characteristics of the article.

19. A system in accordance with claim 18, wherein the dimension sorter diverts the articles between the one or more single file paths, into single file rows of articles where the articles generally have a similar size/shape.

20. A system in accordance with claim 13, wherein at least one of said sensors are of the type including at least one of a photo-electric type sensor, a potentiometer type sensor, an encoder type sensor, an electric type sensor, and a machine vision state type sensor.

21. A system for dimensionally sorting a plurality of received articles, each article having a varying size and shape for use with a means for conveying articles comprising:

path dividers for singulating the articles into single file rows along one or more paths, which the articles pass;

a plurality of sensor heads positioned at one or more points along the one or more paths, each sensor head including a contact shaft which passively engages the articles and deflects an amount corresponding to the size/shape of the article passing in proximity thereto, said sensor heads including at least one deflectable sensor operatively associated with a respective one of each of said rows for measuring the height of each article conveyed in that respective row and at least one deflectable sensor operatively associated with a respective one of each of said rows for measuring the width of each article conveyed in that respective row; and a processing unit for receiving the sensor head readings and making a determination of the size/shape of the articles and for producing output data for later differentiation of the articles.

* * * * *